MOTOR COOLING SYSTEMS

Original Filed May 15, 1946 2 Sheets-Sheet 1

INVENTOR.
Gordon M. De Jarlais
BY
Robert H. Wendt
Atty.

MOTOR COOLING SYSTEMS

Original Filed May 15, 1946 2 Sheets-Sheet 2

Inventor:
Gordon M. De Jarlais
By: Robert H. Wendt
Atty.

United States Patent Office

Re. 24,192
Reissued Aug. 7, 1956

24,192

MOTOR COOLING SYSTEMS

Gordon M. De Jarlais, Dallas, Tex., assignor, by mesne assignments, to Whirlpool-Seeger Corporation, St. Joseph, Mich., a corporation of Delaware Original No. 2,459,311, dated January 18, 1949, Serial No. 669,756, May 15, 1946. Application for reissue October 30, 1952, Serial No. 317,851

9 Claims. (Cl. 62—117.75)

Matter enclosed in heavy brackets [ ] appears in the original patent but forms no part of this reissue specification; matter printed in italics indicates the additions made by reissue.

The present invention relates to motor cooling systems, and is particularly concerned with an improved cooling system for cooling the motors of refrigeration systems of the type employing a motor compressor.

The present invention relates to an improved system over that covered by the United States patent to James H. Dennedy No. 1,960,576, issued May 29, 1934, on a refrigeration system.

One of the objects of the invention is the provision of an improved motor cooling system which is adapted to provide the most efficient cooling for the motor and compressor of a refrigeration system.

Another object of the invention is the provision of an improved motor cooling system for refrigeration apparatus by means of which the cooling fins on the compressor housing may be eliminated, and the noise level of the apparatus substantially reduced.

Another object of the invention is the provision of an improved refrigeration system with provision for motor and compressor cooling, that is also adapted to produce efficient oil separation so that oil is kept out of the low side of the system and the efficiency of the system is not reduced by circulating large amounts of oil through the evaporator.

Another object of the invention is the provision of an improved motor compressor construction and motor cooling apparatus in which the motor and compressor have separate housings but the usual housing enclosing the assembly is not required and, therefore, the cost of the motor compressor assembly may be substantially reduced.

Still another object of the invention is the provision of an improved cooling system for the motors of refrigeration apparatus which is adapted to utilize effectively the cooling arrangements such as the condenser tubes which are provided for this purpose, and in which the cooling effect conforms very closely to the cooling which is required.

Another object of the invention is the provision of an improved refrigeration system which is efficient and in which the motor is adequately cooled and oil returned to the oil reservoir in the motor housing so that the oil which is circulated through the low side of the system is reduced to a minimum.

Another object of the invention is the provision of an improved refrigeration system which is simple, efficient, sturdy, adapted to be manufactured at a low cost, and capable of being used for a long period of time without necessity for repair or replacement or other servicing.

Other objects and advantages of the invention will be apparent from the following description and the accompanying drawings, in which similar characters of reference indicate similar parts throughout the several views.

Referring to the drawings, of which there are two sheets,

Figure 3:
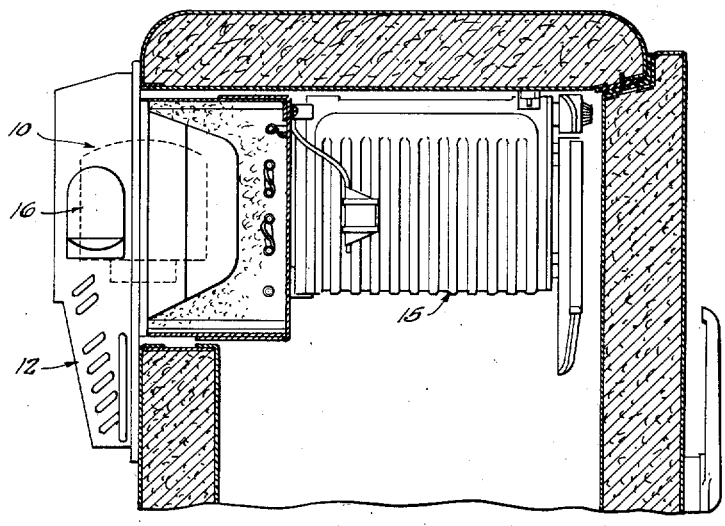
Fig. 3 is a side elevational view of the removable refrigeration apparatus shown in partial section and shown in a fragmentary sectional view of the cabinet.
Figure 1:
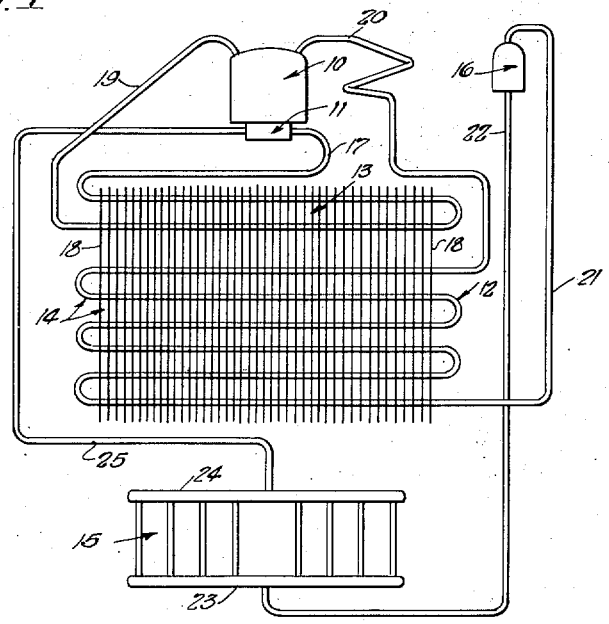
Fig. 1 is a diagrammatic elevational view of the refrigeration system.

Referring to Fig. 1, the present refrigeration system preferably includes a motor 10 and a compressor 11 driven by the motor, and a condenser 12 which utilizes a pair of condenser sections 13 and 14 for reducing the vaporized refrigerant to liquid and for cooling the motor.

In the diagrammatic system of Fig. 1, 15 indicates the evaporator, 16 the float valve chamber, and the course of the refrigerant through the system is as follows: The outlet from the motor compressor 11 is connected by conduit 17 to the inlet part of the condenser section 13, which may comprise one or more of the tubes which are thermally connected to the same fins 18 as are connected to the main condenser section 14.

The outlet end of the tubes of the condenser section 13 is connected by conduit 19 to the interior of the motor housing 10, preferably at its upper end. Another conduit 20 leads from the upper end of the motor housing 10 to the inlet end of the tubes forming the condenser section 14, and the outlet end of these tubes is connected by a conduit 21 to the float valve chamber 16.

The discharge opening from the float valve chamber 16 is connected by a conduit 22 to the refrigerant distributing conduit 23 of an evaporator 15, and the vapor headers 24 of the evaporator are connected by a conduit 25 to the inlet of the motor compressor 11.

Figure 2:
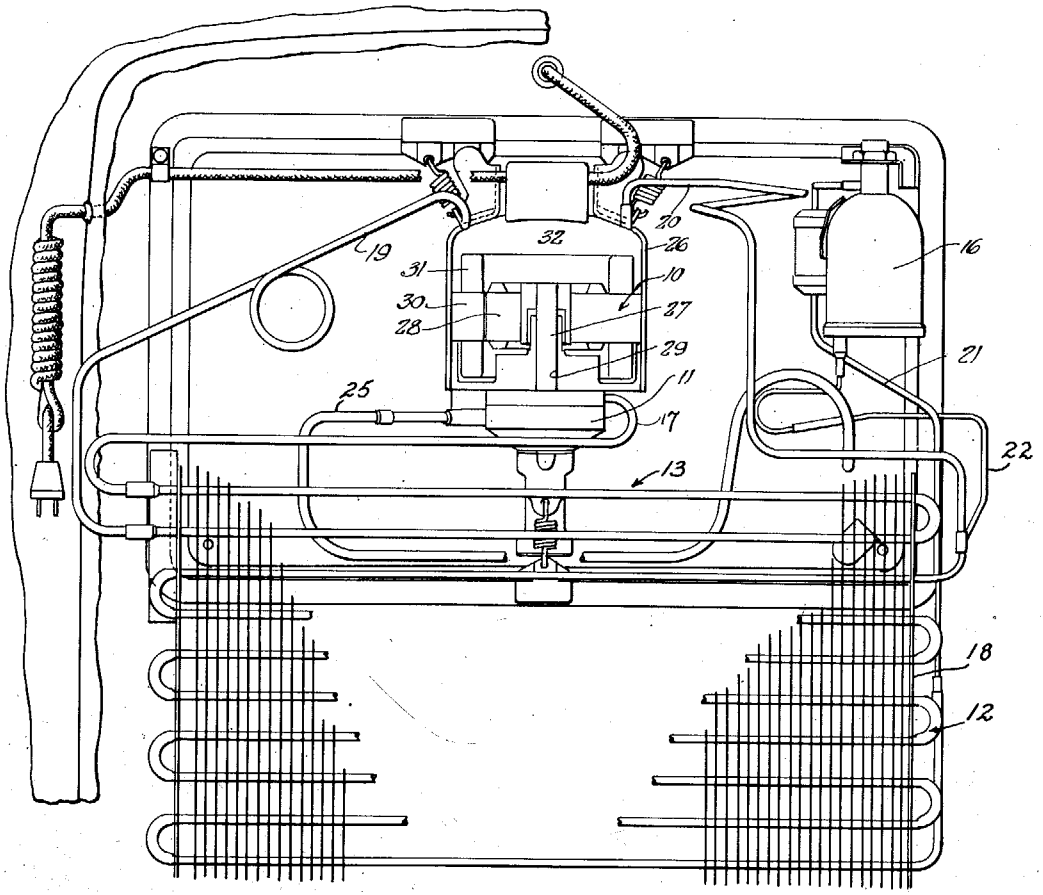
Fig. 2 is a fragmentary rear elevational view of the cabinet showing a rear view of the removable refrigeration unit.

Referring to Fig. 2, this is a rear elevational view of the actual refrigeration apparatus unit of the type adapted to be mounted in the back of a cabinet in such manner that the motor and compressor are housed partly in the rear wall and partly outside of the cabinet shell. The same numerals have been applied to the parts of this drawing, but the structure is shown in greater detail, and it will be noted that the motor 10 and compressor 11 do not require an additional assembly housing enclosing the separate motor and compressor housing.

The motor housing is here indicated by the numeral 26 and it is shown in connection with the motor shaft 27, motor 28, shaft bearing 29, stator 30 and windings 31. The housing 26 of the motor 10 is hermetically sealed and has a chamber or space 32 at its upper end adjacent the inlet from the conduit 19 and the outlet to the conduit 20.

The operation of the system is as follows: Refrigerant is withdrawn from the evaporator 15 directly into the compressor cylinder 11 through the vapor conduit 25. This permits operation with a minimum heating of the suction gas, as contrasted with the systems of the prior art in which the suction conduit may lead into an auxiliary housing of the compressor or motor, which housing itself is heated by being in metallic contact with the compressor and motor.

Heating the suction gas before entering the compressor would reduce the density of the gas, which in turn would reduce the capacity of the compressor, and it is desirable to avoid such heating because it would thus reduce the efficiency of the compressor. Therefore, the introduction of refrigerant vapor directly into the cylinder of the compressor permits the compressor to operate more efficiently than it would if the suction gas had been heated and had thus had its density reduced.

The compressed and, therefore, heated vapor is conducted directly out of the compressor 11 by the conduit 17 in order to carry away from the compressor and motor, at the earliest opportunity, the heat which has been generated by the compressor. If this heated and compressed gas from the compressor outlet were brought into contact with auxiliary housings of metal which are also connected to the motor, much of this heat might be transmitted by conduction to the motor whereas the present system provides for the carrying away of the heat of the compressed vapor at once.

The discharge vapor contains superheated refrigerant gas and a considerable amount of lubricating oil, the latter being in a mist or vapor condition. The discharge vapor is at a relatively high temperature as compared with the temperature of the system.

This discharge vapor from the compressor is conducted by conduit 17 to the inlet portion 13 of the condenser through which it is passed and partially cooled and condensed. In this portion of the condenser the superheat of the refrigerant gas is removed, a portion of the refrigerant gas is condensed to a liquid and is mixed with the lubricating oil which is also now reduced to a liquid condition.

The preliminary cooling of the discharge vapor from the compressor is accomplished under the most efficient conditions, because it takes place at the highest possible temperture difference, that is, the superheated vapor temperature of approximately 250° F., as compared with the ambient air temperature assumed to be 110° F.

Thus the cooling may be accomplished with the least possible amount of condenser surface From the condenser section 13 the refrigerant gas is conducted by conduit 19 into the motor housing 26. The conduit 19 carries refrigerant gas at saturation temperature and drops of the liquid oil-refrigerant mixture, the refrigerant having been only partially liquefied.

Emerging from the conduit 19 into the motor housing space 32 the velocity of the gas and entrained liquid is greatly reduced because of the enlarged cross-sectional area of the stream in the space 32. This reduction in velocity causes the liquid to drop and the oil refrigerant mixture contacts and cools the motor. The oil runs down through the windings to the oil sump. Therefore, no separate cooling or oil separation system is required As described in the prior patent to James H. Dennedy, to which reference is made on page 1, a suitable conduit (not shown) is provided for conducting oil from the oil sump at the base of the motor housing back to the compressor inlet.

The liquid refrigerant partially condensed in the condenser section 13 is vaporized by contact with the heated motor parts, cooling the motor very effectively by utilizing heat of the motor to evaporate the liquid refrigerant.

The refrigerant vapor from the space 32 of the motor housing, containing practically no oil, is then conducted from the housing through the conduit 20 to the main or second section 14 of the of the condenser 12. Here the refrigerant is condensed and its flow being regulated by the float valve chamber in the chamber 16 the refrigerant again enters the evaporator 15.

Various types of evaporators may be employed, the one selected for illustration having a refrigerant distributing conduit at the bottom, a multiplicity of conduits extending upwardly on both sides between sheets of metal and headers 24 at the top. The suction pipe 25 is connected to the headers 24.

It has been found that where a relatively large cooling effect is required the present system conforms to the requirement, and where a relatively small cooling effect is required the system also conforms to the cooling requirement under these conditions. For example, if the system were operating under rather adverse conditions at 110° F. ambient temperature and 30 pounds per square inch suction pressure, the hot gas at approximately 250° F. is superheated approximately 100° F. as it is discharged from the compressor to the first condenser section.

The saturated vapor-oil refrigerant mixture enters the motor housing and is again heated so that on leaving the housing the temperature may be approximately 200° F. or 50° F. superheat.

At low ambient temperatures, such as 80° F. to 70° F., there is a somewhat larger amount of refrigerant in the oil which cools the compressor cylinder. The resulting discharged vapor carries less superheat than is encountered in the case of adverse conditions. On passing through the housing the refrigerant picks up very little superheat (4° F. to 8° F.).

Thus where a relatively large cooling effect is required, it is provided by this system and where a relatively small cooling effect is required the system conforms to this requirement.

It will thus be observed that I have invented an improved cooling system adapted to cool the motor and compressor of a refrigeration apparatus very efficiently, while separating the oil and keeping the oil out of the evaporator, thus increasing the efficiency of the entire refrigeration system.

The present motor cooling systetm is very efficient in regard to condenser area as it operates at a maximum temperature difference. No separate oil coolings or oil separators are required, and the auxiliary motor and compressor chambers may be eliminated.

The present system eliminates the necessity for cooling fins on the compressor housing and thus effects a reduction of the noise level, as such fins may tend to vibrate and cause a hum or an increased noise level. The cooling effect produced by my system also conforms quite closely to the cooling which is required under different ambient temperature conditions.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. The method of refrigeration which comprises withdrawing vapor from an evaporator directly into a compressor located outside of a motor housing, compressing the vapor and discharging the superheated and compressed vapor directly from the compressor into a preliminary cooling condenser, partially condensing the vapor and consolidating the oil entrained therewith into droplets in said condenser and conducting the partially condensed vapor and oil from the condenser into an upper part of the housing of a motor driving said compressor and having a housing separate from said compressor, causing the condensed liquid refrigerant and oil to run down in the motor housing to cool the motor parts, the refrigerant again evaporating in this cooling operation, and the oil being separated and collected in an oil sump, and discharging the vapor substantially without oil from the top of the motor housing into a main condenser, where it is cooled and liquefied for use in the evaporator.

2. The method of refrigeration which comprises withdrawing vapor from an evaporator directly into a compressor located outside of a motor housing, compressing the vapor and discharging the superheated and compressed vapor directly from the compressor into a preliminary cooling condenser, partially condensing the vapor and consolidating the oil entrained therewith into droplets in said condenser and conducting the partially condensed vapor and oil from the condenser into an upper part of the housing of a motor driving said compressor and having a housing separate from said compressor, causing the condensed liquid refrigerant and oil to run down in the motor housing to cool the motor parts, the refrigerant again evaporating in this cooling operation, and the oil being separated and collected in an oil sump, and discharging the vapor substantially without oil from the top of the motor housing into a main condenser, where it is cooled and liquefied for use in the evaporator, and cooling the external parts of the motor housing and the compressor housing and removing the heat radiated therefrom by passing a current of air upward from the said condensers.

3. In a refrigeration system, a motor compressor assembly comprising a motor having a separate housing and a compressor having a separate housing, these housings being located adjacent each other, and the motor having a shaft extending into the compressor, an evaporator having its suction side directly connected to the inlet of said compressor, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator.

4. In a refrigeration system, a motor compressor assembly comprising a motor having a separate housing and a compressor having a separate housing, these housings being located adjacent each other, and the motor having a shaft extending into the compressor, an evaporator having its suction side directly connected to the inlet of said compressor, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator, the amount of cooling effect of said system on the motor and compressor being determined by the ambient temperature in which the system operates so that there is a greater cooling effect, as required, when the system is operating in a higher ambient temperature.

5. In a refrigeration system, a motor compressor assembly comprising a motor having a separate housing and a compressor having a separate housing, these housings being located adjacent each other, and the motor having a shaft extending into the compressor, an evaporator having its suction side directly connected to the inlet of said compressor, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator, the said main condenser section including a heat exchange area many times that of the preliminary condenser, and the said condensers being located below the motor and compressor in the stream of air passing upward about the motor and compressor.

*6. In a refrigeration system, a motor compressor assembly comprising a motor having a separate housing and a compressor having a separate housing, these housings being located adjacent each other, and forming a single casing arranged to receive refrigerant and having a lubricant reservoir, and the motor having a shaft extending into the compressor, forming a compressor motor combination unit, with the motor above the compressor, said unit having a channel medium extending into said lubricant reservoir to allow the working parts of said compressor to be lubricated, a charge of refrigerant and oil in said system, an evaporator having its suction side directly connected to the inlet of said compressor, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, thereby lubricating the motor, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator, said preliminary cooling condenser comprising a separate coil arranged exteriorly of the casing, and the gas exerting a pressure on the oil in the reservoir characterizing a forced lubrication of the compressor parts through said channel medium.*

*7. In a refrigeration system, a motor compressor assembly comprising a motor having a separate housing and a compressor having a separate housing, these housings being located adjacent each other, and forming a casing arranged to receive refrigerant and having a lubricant reservoir, and the motor having a shaft extending into the compressor, forming a compressor motor combination unit, with the motor above the compressor, a charge of refrigerant and oil in said system, an evaporator having its suction side directly connected to the inlet of said compressor, said unit pumping refrigerant from*

*said evaporator to compress the refrigerant, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, thereby lubricating the motor, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator, said preliminary cooling condenser comprising a separate coil arranged exteriorly of the casing.*

*8. In a refrigeration system, a motor compressor assembly comprising a motor having a separate housing and a compressor having a separate housing, these housings being located adjacent each other, and forming a casing arranged to receive refrigerant and having a lubricant reservoir, and the motor having a shaft extending into the compressor, forming a compressor motor combination unit, with the motor above the compressor, an evaporator having its suction side directly connected to the inlet of said compressor, a preliminary cooling condenser having its inlet connected directly to the outlet of the compressor, whereby the superheated and compressed gas is carried away from the compressor without said gas passing through the motor housing, the outlet of said preliminary condenser being connected to the top of the motor housing, and said preliminary condenser having a predetermined heat exchange area to condense partially the refrigerant vapor and consolidate the entrained oil into droplets, the partially condensed refrigerant and oil running down on the motor parts inside the motor housing, thereby lubricating the motor, and the partially condensed vapor effecting a cooling of said motor parts with a resultant revaporization of the refrigerant in the motor housing, the oil collecting in a sump in the lower part of the motor housing to separate the oil from the refrigerant, a main condenser having a predetermined heat exchange area to cool and liquefy the refrigerant vapor received from the motor housing, the said motor housing having another conduit connecting its upper part with said main condenser, and conduit means connecting said main condenser with the evaporator, said preliminary cooling condenser comprising a separate coil arranged exteriorly of the casing, the amount of cooling effect of said system on the motor and compressor being determined by the ambient temperature in which the system operates so that there is a greater cooling effect, as required, when the system is operating in a higher ambient temperature.*

*9. The method of refrigeration which comprises withdrawing vapor from an evaporator directly into a compressor located outside of a motor housing, compressing the vapor and discharging the superheated and compressed vapor directly from the compressor into a preliminary cooling condenser, cooling the superheated and compressed vapor and oil to a temperature below the temperature of the motor parts, in said condenser, partially condensing the vapor and consolidating the oil entrained therewith into droplets in said condenser and conducting the partially condensed vapor and oil from the condenser into an upper part of the housing of a motor driving said compressor and having a housing separate from said compressor, causing the condensed liquid refrigerant and oil to run down in the motor housto cool the motor parts, the refrigerant again evaporating in this cooling operation, and the oil being separated and collected in an oil sump, and discharging the vapor substantially without oil from the top of the motor housing into a main condenser, where it is cooled and liquefied for use in the evaporator.*

References Cited in the file of this patent or the original patent

UNITED STATES PATENTS

| | | |
|---|---|---|
| 1,898,438 | Greenwald | Feb. 21, 1933 |
| 1,960,576 | Dennedy | May 29, 1934 |
| 2,420,442 | Rataiczak | May 13, 1947 |